United States Patent
Ehrler et al.

(10) Patent No.: US 11,607,737 B2
(45) Date of Patent: Mar. 21, 2023

(54) MILLING TOOL

(71) Applicant: GUEHRING KG, Albstadt (DE)

(72) Inventors: Rolf Ehrler, Teningen (DE); Martin Dallmann, Chemnitz (DE); Jakob Ebel, Inzigkofen (DE)

(73) Assignee: Guehring KG, Albstadt (DE)

( * ) Notice: Subject to any disclaimer, the term of this patent is extended or adjusted under 35 U.S.C. 154(b) by 77 days.

(21) Appl. No.: 17/022,510

(22) Filed: Sep. 16, 2020

(65) Prior Publication Data

US 2021/0078087 A1     Mar. 18, 2021

(30) Foreign Application Priority Data

Sep. 16, 2019  (DE) .................. 10 2019 214 041.6

(51) Int. Cl.
B23C 5/10       (2006.01)

(52) U.S. Cl.
CPC .................................... B23C 5/10 (2013.01)

(58) Field of Classification Search
CPC .... B23C 2210/0407; B23C 2210/0435; B23C 2210/207; B23C 3/00; B23C 5/10; B23C 9/00; B23B 51/101–103; B23B 51/105; B23B 51/10; B23B 51/0081; B23B 2251/50; B23B 2251/18; B23B 2251/204; B23B 2265/08

See application file for complete search history.

(56) References Cited

U.S. PATENT DOCUMENTS

| 1,346,105 | A | * | 7/1920 | Bosse | ..................... B23B 51/10 |
| | | | | | 407/45 |
| 2,041,587 | A | * | 5/1936 | Lawrence | ................. B23C 3/05 |
| | | | | | 407/119 |
| 2,317,615 | A | * | 4/1943 | Johnson | ................ B23B 51/104 |
| | | | | | 408/202 |
| 2,351,578 | A | * | 6/1944 | Bauer | .................. B23B 51/102 |
| | | | | | 408/239 R |

(Continued)

FOREIGN PATENT DOCUMENTS

| CN | 208019493 U | 10/2018 |
| CN | 209157251 U | 7/2019 |

(Continued)

OTHER PUBLICATIONS

DPMAregister Print Out dated Mar. 26, 2021.

*Primary Examiner* — Nicole N Ramos
(74) *Attorney, Agent, or Firm* — Kevin C. Brown

(57) ABSTRACT

A milling tool for producing chamfer surfaces at workpieces. It has a cylindrical shaft and a cutting part, which has at least two end cutting edges, which are each located on a cone jacket surface and which run in a spiraled convex manner in the direction of rotation, and which each extend from a radially outer cutting corner to an inner cutting corner on the end side. To broaden the area of application of the milling tool to processes, such as the "ramping" or the linear diagonal plunging, respectively, the circular milling, the spot-drilling, or the waterline milling, the end cutting edges merge at the inner cutting corner into center cutting edges, which are located on a cone jacket surface with a tip angle of above 180°, and which run with a positive chip angle into a region of the milling cutter center located in the milling cutter core.

31 Claims, 7 Drawing Sheets

(56) References Cited

U.S. PATENT DOCUMENTS

| | | | | | |
|---|---|---|---|---|---|
| 2,528,300 | A | * | 10/1950 | Degner | E21B 10/16 144/240 |
| 2,663,546 | A | * | 12/1953 | Kammerer | E21B 10/34 175/344 |
| 2,696,744 | A | * | 12/1954 | Severance | B23B 51/10 408/229 |
| 2,795,979 | A | * | 6/1957 | Zerwick | B23B 51/10 408/229 |
| 2,932,080 | A | * | 4/1960 | Schmidt | B23C 5/22 407/120 |
| 3,775,819 | A | * | 12/1973 | Ribich | B23C 5/10 407/53 |
| 4,032,251 | A | * | 6/1977 | Ribich | B23B 51/10 408/199 |
| 4,293,254 | A | * | 10/1981 | Markovics | B23B 51/10 408/229 |
| 5,833,402 | A | * | 11/1998 | Martin | B24B 3/065 407/62 |
| 6,497,540 | B1 | * | 12/2002 | Shikata | B23C 5/1009 407/53 |
| 7,150,589 | B2 | * | 12/2006 | Nordlin | B23B 51/101 144/237 |
| 7,753,624 | B2 | * | 7/2010 | Gunther | B23C 5/10 407/53 |
| 9,623,491 | B2 | | 4/2017 | Dieckilman | B23C 3/126 |
| 2003/0026666 | A1 | * | 2/2003 | Toublanc | B23C 5/28 408/230 |
| 2003/0059263 | A1 | * | 3/2003 | Chen | B44B 3/061 407/54 |
| 2005/0186037 | A1 | * | 8/2005 | Svensson | B23C 5/10 407/53 |
| 2009/0060663 | A1 | * | 3/2009 | Rouge | B23C 5/10 407/44 |
| 2009/0252564 | A1 | * | 10/2009 | Volokh | B23C 5/10 407/56 |
| 2010/0008736 | A1 | * | 1/2010 | Matsunaga | B23C 5/10 408/230 |
| 2010/0032216 | A1 | * | 2/2010 | Osborne, Jr. | E21B 10/16 407/57 |
| 2011/0217132 | A1 | * | 9/2011 | Wells | B23C 5/10 407/54 |
| 2012/0093592 | A1 | * | 4/2012 | Durst | B23G 7/02 408/144 |
| 2013/0051937 | A1 | * | 2/2013 | Volokh | B23C 5/1009 407/42 |
| 2013/0209184 | A1 | * | 8/2013 | Barry | B23P 15/34 407/53 |
| 2013/0315681 | A1 | * | 11/2013 | Volokh | B23C 5/12 407/53 |
| 2014/0003873 | A1 | * | 1/2014 | Han | B23C 5/10 407/54 |
| 2014/0119844 | A1 | * | 5/2014 | Osawa | B23C 5/10 407/54 |
| 2014/0356081 | A1 | * | 12/2014 | Davis | B23C 5/28 407/54 |
| 2015/0030396 | A1 | * | 1/2015 | Abe | B23C 5/28 407/11 |
| 2015/0209866 | A1 | | 7/2015 | Chang | |
| 2015/0251254 | A1 | * | 9/2015 | Mutlu | B23C 5/10 407/54 |
| 2016/0175948 | A1 | * | 6/2016 | Sakai | B23C 5/1009 407/54 |
| 2016/0297012 | A1 | * | 10/2016 | Davis | B23C 5/10 |
| 2017/0304909 | A1 | * | 10/2017 | Fukata | B23C 5/10 |
| 2017/0304910 | A1 | * | 10/2017 | Suehara | B23C 5/10 |
| 2018/0030590 | A1 | * | 2/2018 | Schier | C23C 14/0641 |
| 2020/0038968 | A1 | * | 2/2020 | Schairer | B23B 51/10 |

FOREIGN PATENT DOCUMENTS

| | | | | |
|---|---|---|---|---|
| DE | 29721963 U1 | * | 1/1998 | B23B 51/10 |
| JP | 3111276 U | | 6/2005 | |
| JP | 2006-026853 A1 | | 2/2006 | |

\* cited by examiner

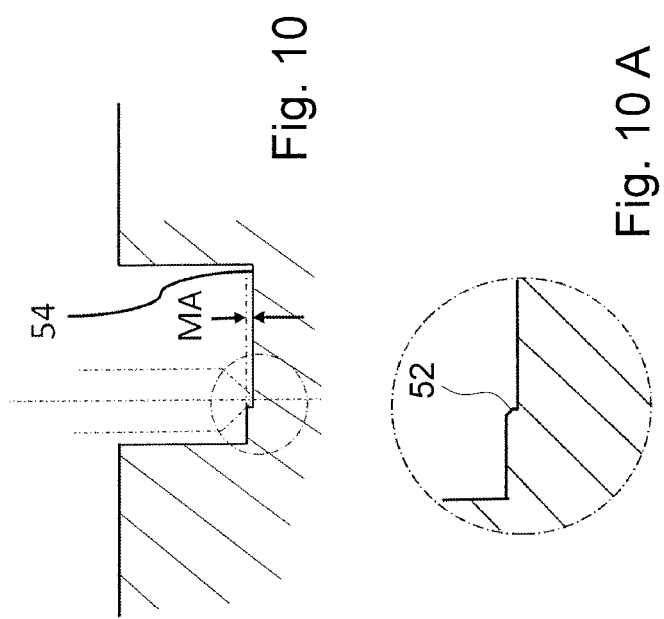
Fig. 10
Fig. 10 A
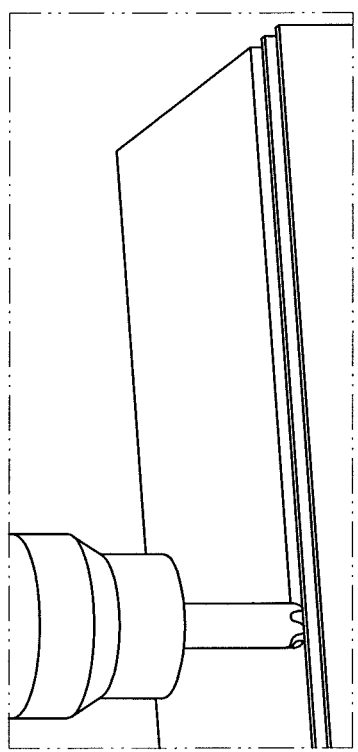
Fig. 7
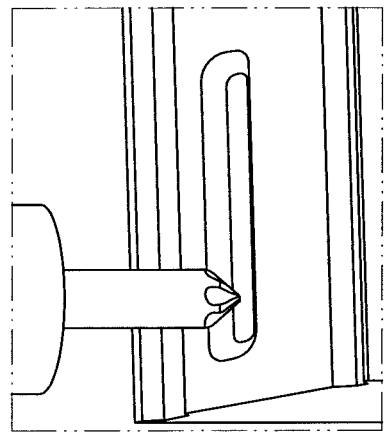
Fig. 9
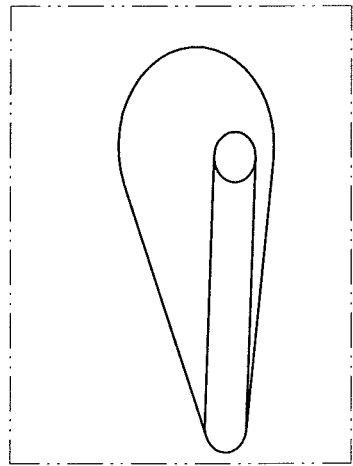
Fig. 6
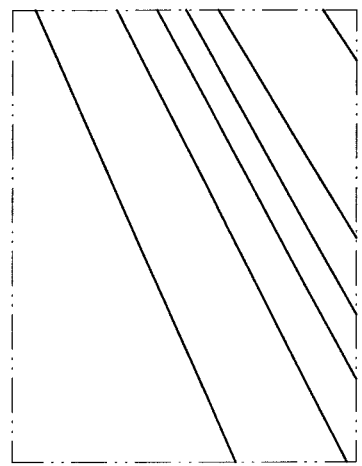
Fig. 8

MILLING TOOL

TECHNICAL FIELD

The present disclosure relates to a milling tool, in particular a chamfering cutter, according to the preamble of patent claim 1. Tools of this type are used in the form of end milling cutters in various designs comprising a different number of cutting edges and a different cutting edge course.

For example, a chamfering cutter comprising 5 end cutting edges, which run in a spiraled convex manner in the direction of rotation, is on the market under the name "TOGRON® Multi Chamfer". Similar milling tools are sold by the OSG Corporation. However, the area of application of these milling tools is limited to the processing of round and flat chamfer faces, which can be accessed relatively easily.

The invention is based on the object of further developing a generic milling tool in such a way that it has a greatly expanded area of application and ensures an increased material removal rate with improved smooth running.

This object is solved by a milling tool comprising the features of patent claim 1.

In addition to the spiraled course of the end cutting edges, by means of which the cut is usually made softer, a further significant feature of the milling tool according to the invention is that at the radially inner cutting corner, the end cutting edges merge into center cutting edges, which are located at a cone jacket surface with a tip angle of over 180° and run with a defined, preferably positive chip angle in a region of the milling cutter center located in the milling cutter core. It is initially ensured therewith that the entire length of the end cutting edges can be used for the machining process. This is so, because the radially inner cutting corner is thus also part of the end cutting edge. Due to the fact that the center cutting edges are located on a cone jacket surface with a tip angle of above 180°, a type of hollow grinding of the milling cutter tip is created, which makes it possible to also attach chamfer faces to workpiece edges, which are located at the smallest distance from a bottom surface of a groove. Due to the design of the center cutting edges, the milling tool is finally able to plunge into a workpiece with the center cutting edges. Due to the hollow grinding, the milling cutter center is sufficiently stable, even if the radially inner cutting corner is located on a diameter, which is only a fraction, for example one-fourth, of the nominal diameter of the milling tool.

The novel design of the milling tool is based on the surprising knowledge that the relatively flat center cutting edges are readily able to ensure a sufficient chip formation, namely even if the chip angle of the center cutting edges as a whole or in some areas, such as, e.g., in the milling cutter core, is negative or slightly negative, respectively, due to the fact that, compared to the nominal diameter they only have a relatively small radial extension. The milling tool can thus also be used for further machining processes, such as the linear or circular angled plunging or the ramping, respectively, the circular milling, the so-called waterline milling, the profile milling, and even the drilling into solid material, thus the spot-drilling. This expansion of the area of application of the milling tool is favored in that the radially inner cutting corners are located on a common pitch circle and in a common radial plane, so that the milling tool does not drift during drilling. The hollow grinding can thereby additionally be used for centering.

The concept can generally be used for milling tools comprising any number of end cutting edges. Tests have shown, however, that the number of the end cutting edges is to be at least 3, preferably 5, in the case of nominal diameters starting at 10 mm, so that a processing with a desired material removal rate, which is as high as possible, can be realized reliably.

Advantageous further developments are subject matter of the subclaims.

If, according to claim 2, in the region of the milling cutter core the center cutting edges are formed by a point thinning, with which the end flank of the center cutting edge, which in each case leads in the direction of rotation, is formed, this results in a simplified production of the milling tool. This is so, because the movement of the grinding disk for the production of the point thinning can simultaneously be used to produce the end flank of the end cutting edge, which in each case runs in an adjacently leading manner in the direction of rotation. This further development is advantageous in particular when more than 2, preferably more than 4 center cutting edges are present.

The grinding of the milling tool is further improved and additionally simplified with regard to the cutting edge stability, when the center cutting edges according to claim 3 are offset by a predetermined rear center measure to an axial plane, which runs through the center axis and essentially parallel to the center cutting edge. The point thinnings can be ground over center in this way, whereby a center surface area, in which the center cutting edges run together, is limited to a minimum, without forming an undefined tip there.

The point thinning according to claim 3 can generally also be used to correct the course of the center cutting edge outside of the milling cutter core, which can be advantageous when the chip space at the milling cutter tip is to be increased. A particularly high stability of the milling tool results when, according to claim 4, the center cutting edges are formed by the chip groove located between the end cutting edges at least in the region of the radially outer cutting corner.

With regard to the design of the spiraled course of the end cutting edges, there is a broad spectrum of options. An advantageous compromise of a simple production and good chip transport according to a first alternative can be accomplished when, according to claim 5, the end cutting edges are formed in such a way that the axial chip angle, i.e. the angle, which the tangent of the end cutting edge draws with an axial plane, when viewed in the latter, is constant over the entire length of the end cutting edge.

The smooth running of the milling tool can be improved effectively in this case, when at least two of the axial chip angles of the individual end cutting edges, for example all axial chip angles, are different, wherein slight deviations, for example in the range of half an angular degree, are already sufficient. In the case of more than two end cutting edges, the axial chip angles of adjacent end cutting edges are preferably different, for example by 0.5 to 2°, preferably by 1 to 1.5°.

According to an embodiment, according to claim 7, which is advantageous and preferred with regard to the producibility, the end cutting edges thereby follow such a course that an even cutting pitch is present in a reference plane, which is perpendicular on a center axis of the milling tool in the circumferential direction, so that the following applies:

$$AU=360°/z,$$

wherein AU refers to the circumferential distance of adjacent end cutting edges, and z refers to the number of the end cutting edges.

It has been shows that the smooth running can be influenced in a particularly positive manner when, according to claim 8, the reference plane lies in the region of the end cutting edges.

Good machining results in particular with regard to the removal of the chips and cutting performance were achieved for all above-described processing tasks with an axial chip angle in the range of between 18 and 25°, preferably between 20 and 23°.

An alternative for the design of the milling tool, which is likewise advantageous in terms of production, is the subject matter of claim 10, according to which the end cutting edges are formed in such a way that the axial chip angle, as angle which the tangent of the end cutting edge draws with an axial plane at a reference point viewed in said axial plane, increases linearly, starting at the radially inner cutting corner, at the axial distance of the reference point from the radially inner cutting corner. In this way, the chip groove can be introduced with a constant ratio of axial feed speed of the grinding disk, which grinds the chip groove, and rotational speed of the tool blank. In the case of this design, the correct spiral of the clamping nut becomes increasingly flatter with increasing distance from the radially inner cutting corner, as a result of which the effective cutting wedge can be influenced positively.

When, according to claim 11, the arrangement is thereby made such that the axial chip angles of at least two end cutting edges, for example of all end cutting edges, differ from one another at the radially inner cutting corner, an uneven cutting pitch of the end cutting edges is present either over the entire cutting part or over the cutting part with the exception of a reference plane located in said cutting part, as a result of which the smooth running of the milling tool can be influenced in a positive manner.

It has been shown that, in particular in the case of nominal diameters of up to 30 mm, it is sufficient to equip the milling tool with at least 3, preferably 5 end cutting edges, in order to achieve the desired material removal rate.

The tip angle of the cone jacket surface, on which the center cutting edges are located, can be varied within wide limits, and it is generally selected as a function of the material to be machined. For the machining of materials, which are difficult to machine, such as, e.g., high-alloy steels, it has proven to be advantageous to place the tip angle of the cone jacket surface within the range of between 182 and 188°, preferably within the range of between 183 and 185°.

The clearance angle of the center cutting edges is preferably adapted to the nature of the material, which is to be machined. The clearance angle of the center cutting edges is preferably also selected as a function of the nominal diameter of the milling tool. Good results can be achieved in the case of nominal diameters of up to 30 mm in response to the processing of materials, which are difficult to machine, with a clearance angle in the range of between 3 and 20°, preferably between 4 and 10°.

It has been shown that it is already sufficient for the particularly stable design of the milling cutter tip when the rear center measure of the center cutting edges lies in the range of between 0.01 and 0.03×D, preferably between 0.013 and 0.02×D, wherein D refers to the nominal diameter of the milling tool.

The machining performance and the stability of the milling tool can further be influenced via the depth of the chip grooves. Starting at the milling cutter tip, the chip grooves located between the end cutting edges advantageously have a depth, which increases in the axial direction.

In the case of a chamfering cutter for the production of a 45° chamfer, it has turned out to be advantageous when the milling tool, according to claim 17, is designed in such a way that the core diameter at the inner cutting corner lies in the range of between 0.15 to 0.19×D and at the radially outer cutting corner lies in the range of between 0.6 to 0.8×D, wherein D refers to the nominal diameter of the milling tool.

In the case of increased material removal rate, the milling tool is subjected to significant stresses. It is thus advantageous when it is formed in one piece of a hard material, such as solid carbide (SC), preferably micro-grain carbide with a grain size of below 1.3 μm, preferably below 0.8 μm, which also has a positive effect on the stiffness and smooth running. Due to the small grain size, the center cutting edges can be formed in a geometrically exact and dimensionally stable manner, without having to fear cutting edge breaks.

The service life of the milling tool can additionally be increased in that it is equipped with a coating, preferably a TiAlN coating, at least in the region of the cutting edges.

Further advantageous embodiments are subject matter of the remaining subclaims.

BRIEF DESCRIPTION OF THE FIGURES

Exemplary embodiments of the invention will be described in more detail below on the basis of schematic drawings, in which:

FIGS. 3A, 3B, and 3C show views of the milling tool according to the first embodiment for the explanation of the production of the milling cutter ground section, wherein FIG. 3A illustrates a side view, FIG. 3B an end view, and FIG. 3C a section of the side view according to FIG. 3A;

FIGS. 6 to 10 and 10A show schematic illustrations for the visualization of different milling processes, which are possible by means of the milling tool, wherein FIG. 9A shows the detail "XA" in FIG. 10 in enlarged illustration;

DESCRIPTION OF THE EXEMPLARY EMBODIMENTS

Exemplary embodiments of the present disclosure will be described below on the basis of the corresponding figures.

Figure 2:
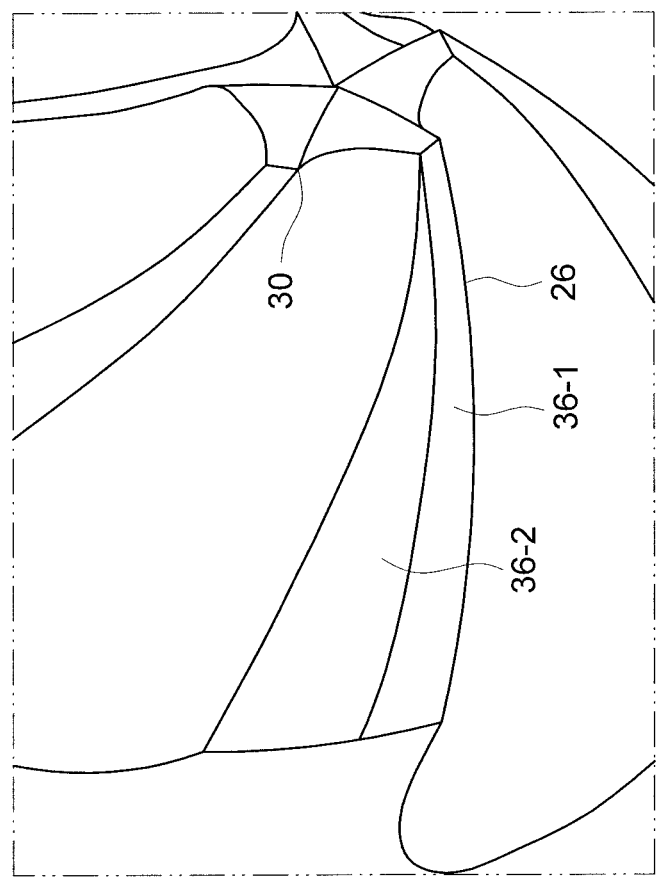
FIG. 2 shows an illustration of the course of the end cutting edges and of the center cutting edges in a slightly modified embodiment in enlarged perspective view.
Figure 1:
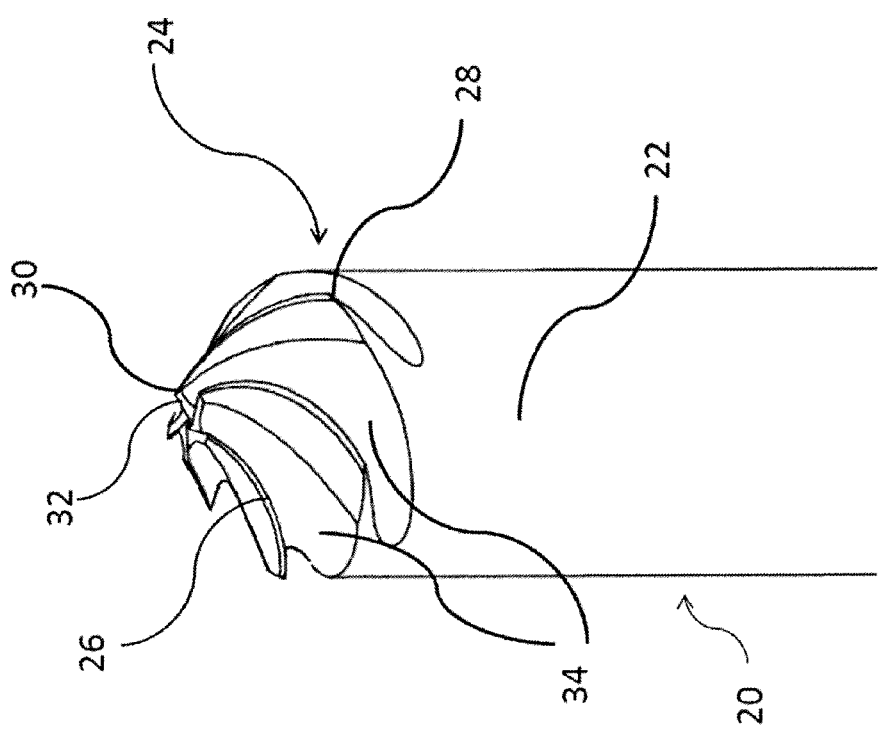
FIG. 1 is a perspective view of a first embodiment of the milling tool.

A milling tool for producing chamfer faces at workpieces is shown with reference numeral 20 in FIG. 1. The milling tool with the nominal diameter DN and the length L (see FIG. 3A) is formed as end milling cutter, i.e. it has a cylindrical shaft 22 comprising a clamping section of the length LS and a cutting part 24, which has 5 end cutting edges 26 in the shown exemplary embodiment. So that the milling tool can perform a chamfering operation, the end cutting edges 26 are located on a common jacket surface MFK of a cone, here of a 90° cone, via which the chamfer angle of, for example, 45° is determined. The end cutting edges 26 are not straight, but they run in a spiraled convex manner in the direction of rotation. In other words, they essentially follow a section of a conical spiral. Chip grooves are identified with 34. The axial length of the cutting part 24 is identified with LSS and is 3.75 mm in the case of a milling tool with a nominal diameter DN of 10 mm, when the radially inner cutting corners 30 are located on a diameter, which corresponds to one-fourth of the nominal diameter DN.

Figure 3:
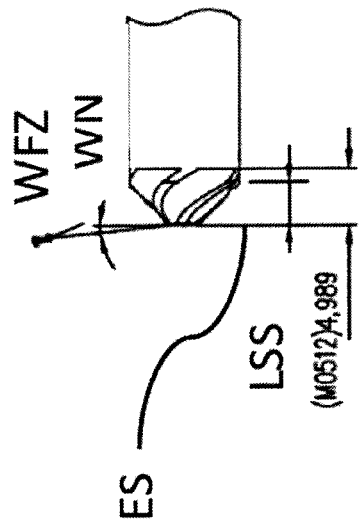
Figure 3:
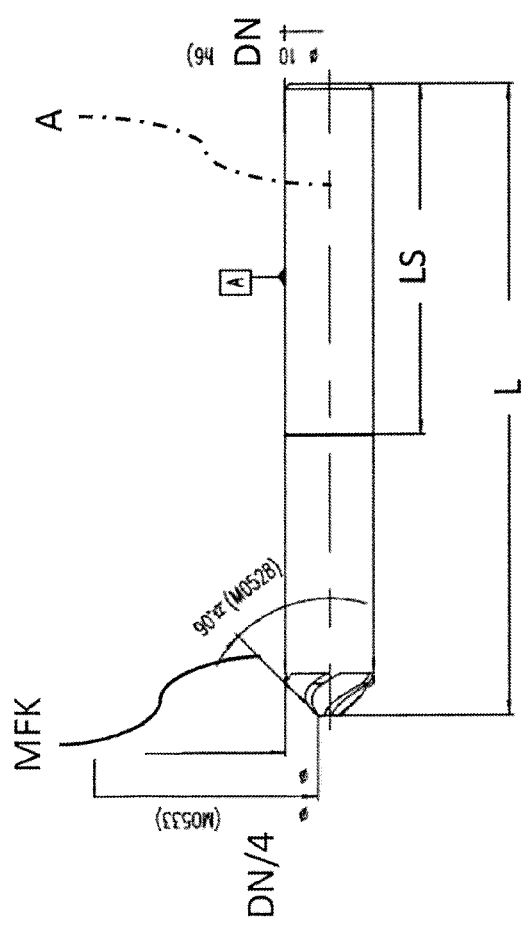
Figure 3:
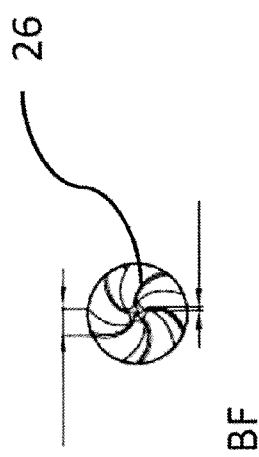

More specifically, the end cutting edges 26 in each case extend from a radially outer cutting corner 28, which is located on the nominal diameter DN, to an inner cutting corner 30 on the end side, which is located on a diameter, which is DN/4 in the case of the embodiment according to FIG. 3. At the radially inner cutting corner 30, the end cutting edges 26 merge into center cutting edges 32, the formation and position of which shall be described in more detail below with reference to FIGS. 2 to 5.

As can be gathered from FIG. 3C, the center cutting edges 26 are inclined towards the clamping section by an angle of inclination WB to a plane ES, which is perpendicular on the center axis A of the milling tool (see FIG. 3C), i.e. they are located on a cone jacket surface, which is not identified in more detail, for the tip angle WSK of which the following applies:

$$WSK=180°+2WN.$$

A preferred angular range for the tip angle WSK of the cone jacket surface lies between 182 and 188°, preferably in the range of between 183 and 185°.

From the radially outer cutting corner 30, the center cutting edges 32 run into a region of the milling cutter center located in the milling cutter core a defined, preferably positive chip angle. From FIGS. 4 and 5, the cutting edge design is shown in detail in an end view and a perspective view. The direction of rotation of the milling tool is identified by means of the arrow RD:

It can be seen that the end cutting edges 26, which run in a spiraled convex manner in the direction of rotation, are formed by grinding in chip grooves 34, which become more and more broad and deep with increasing distance from the radially inner cutting corner 30. At the radially inner cutting corner 30, the core diameter DK (see FIG. 4) advantageously lies in the range of between 0.15 and 0.19×D, and in the range of between 0.6 and 0.8×D at the radially outer cutting corner 28, wherein D refers to the nominal diameter of the milling tool.

It can further be seen that the end cutting edges 26 have two end flanks, a primary end flank 36-1 with a smaller clearance angle of, for example, approximately 10°, and a secondary end flank 36-2 with a larger clearance angle of, for example, approximately 30°. The end flanks 36-1 can thereby be designed such that their width increases towards the radially outer cutting corner 28. In any event, however, it has to be ensured that a sufficiently stable chamfer width BF (see FIG. 4), which, in the case of a milling tool with a nominal diameter DN of 10 mm, is to not lie below 0.1 mm, remains at the radially inner cutting corner 30. In the case of a nominal diameter DN of 16 mm, it can be, for example, 0, m mm.

As long as the center cutting edges 32 are formed by the chip groove 34, i.e. within the region of the radially inner cutting corner 30, they have a positive chip angle. In the region of the milling cutter core, the center cutting edges 32 are formed by a point thinning 38, which is illustrated as cross-hatched area in FIG. 4. In the case of the alternative shown in FIG. 4, the point thinning is designed such that a cutting edge correction of the center cutting edges 32 takes place simultaneously therewith, so that the center cutting edges 32 run from the radially inner cutting corner 30 straight into the region of the milling cutter center. In the case of the alternative according to FIG. 5, no cutting edge correction takes place by means of the point thinning 38.

Figure 4:
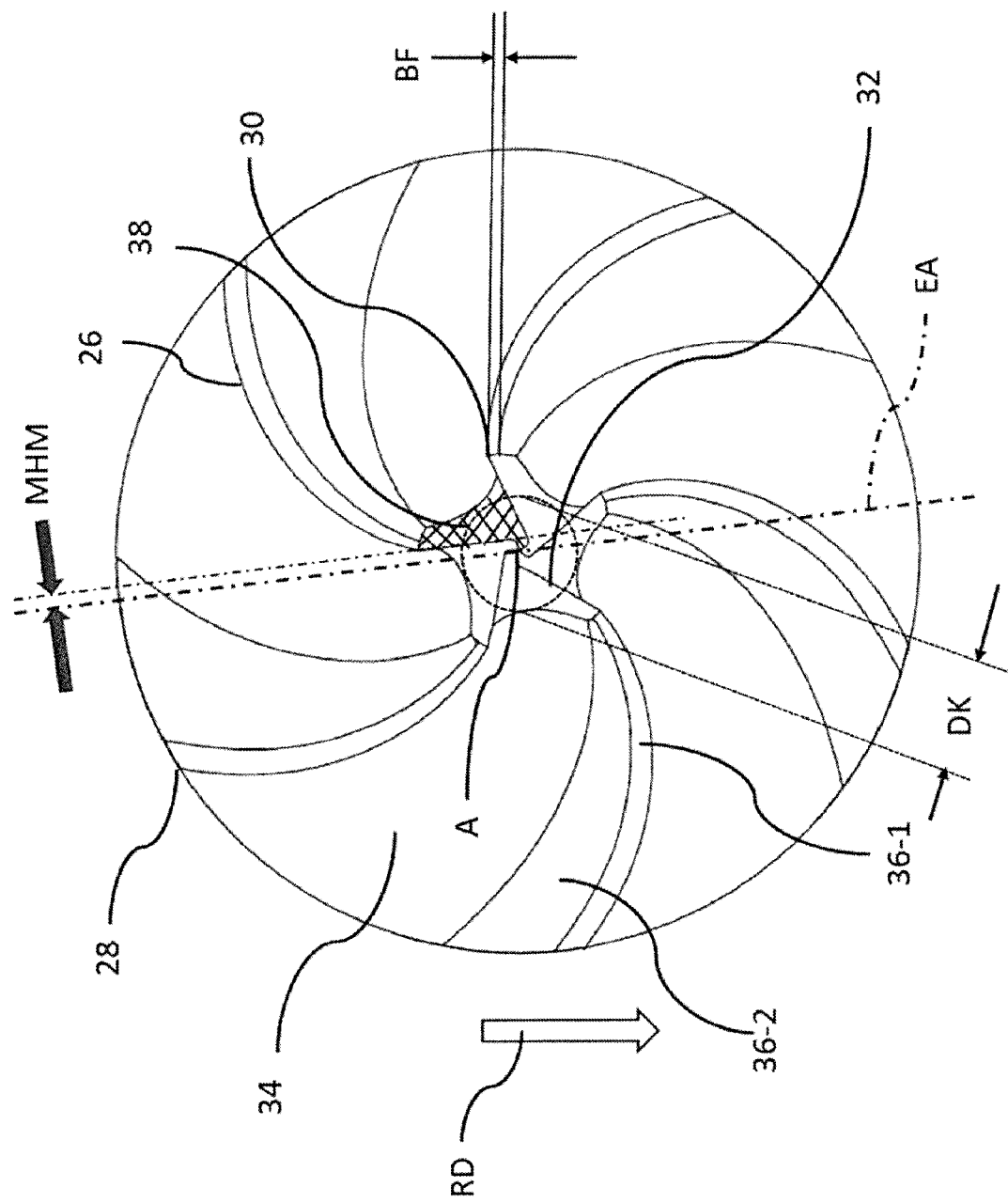
FIG. 4 shows the end view of the milling tool according to FIGS. 2 and 3 in a highly enlarged view.
Figure 5:
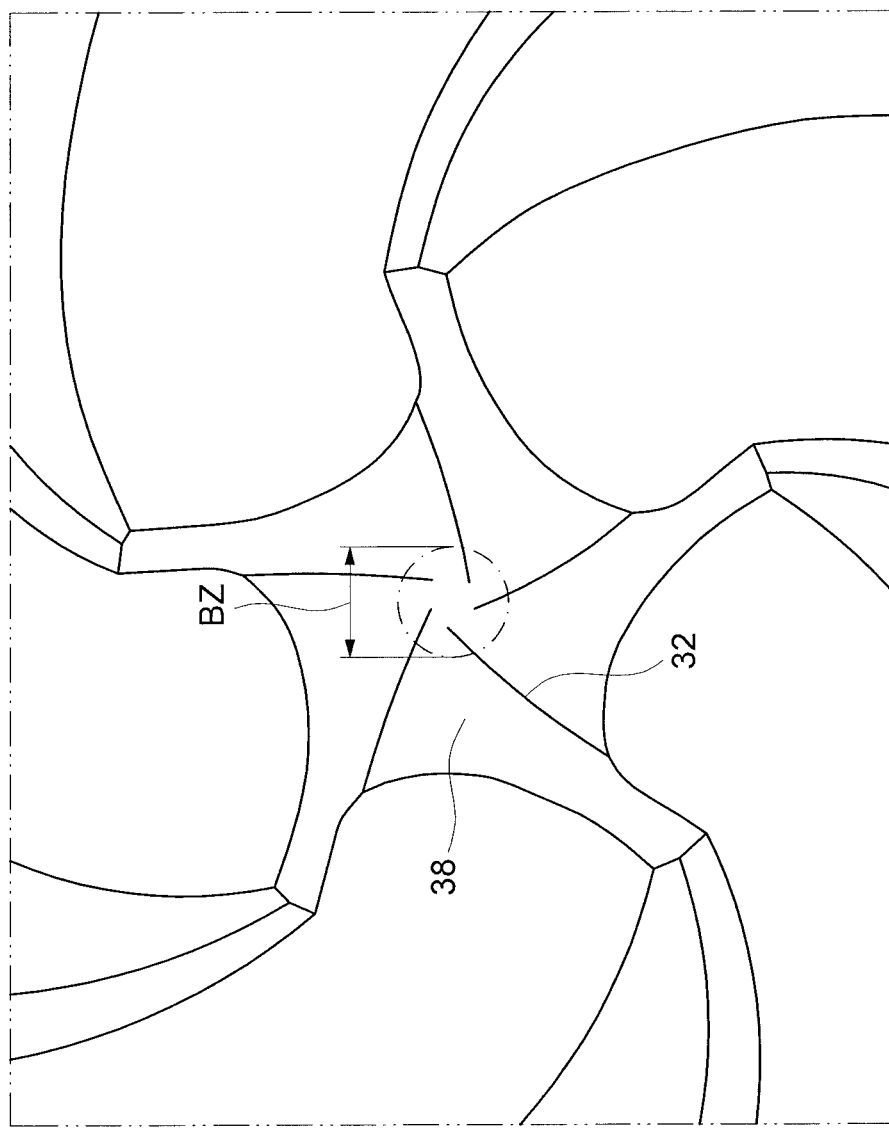
FIG. 5 shows the photographic view of the center cutting edges of a modified alternative of the milling tool.

Both alternatives according to FIGS. 4 and 5 have in common that the point thinning 38 of a first center cutting edge simultaneously forms the end flank of the respective leading center cutting edge in the direction of rotation. The clearance angle of the center cutting edges 32, identified with WFZ in FIG. 3C, can vary in a wide range and it is usually selected as a function of the nominal diameter DN and/or of the material of the milling tool and/or of the material to be machined. The more stable the milling cutter tip has to be, the smaller the clearance angle FWZ is selected. The clearance angles FWZ preferably lie in the range of 3 and 20°, particularly preferably between 4 and 10°.

The point thinning according to FIG. 5 is produced such that the chip angle of the center cutting edges 32 is ZERO or slightly negative, respectively, in the milling cutter core. It is equally possible, however, to keep the chip angle positive at this location, all the way to a center region BZ, in which the center cutting edges 32 run together. The center region has a diameter, which only corresponds to a small fraction of the core diameter.

It can further be gathered from the illustrations according to FIGS. 4 and 5 that the center cutting edges 32 are offset by a predetermined rear center measure MHM to an axial plane EA, which runs through the milling cutter axis A and essentially parallel to the center cutting edge 32, as a result of which the tip grinding of the milling tool is simplified. The rear center measure MHM of the center cutting edges 32 preferably lies in the range of between 0.01 and 0.03×D, preferably between 0.013 and 0.02×D, wherein D refers to the nominal diameter DN of the milling tool.

By means of the above-described design of the milling tool, it is possible to significantly broaden the area of application of the milling tool. This is so, because in addition to the spiraled course of the end cutting edges, by means of which the cut is generally made softer, the center cutting edges designed according to the invention ensure that the entire length of the end cutting edges can be used for the machining process.

Due to the fact that the relatively flat center cutting edges 32 have only a relatively small radial extension, they are readily able to ensure a sufficient chip formation, namely even if the chip angle of the center cutting edges as a whole or in some areas, such as, e.g., in the milling cutter core, is negative or slightly negative, respectively, compared to the nominal diameter DN. The milling tool can thus also be used for further machining processes, which have not been accessible so far, which are suggested in FIGS. 6 to 10 and 10A.

In addition to the groove milling (as shown in FIG. 7) and the groove chamfering (according to FIG. 8), the milling tool is thus also suitable for the circular or linear diagonal plunging or the ramping, respectively, as shown in FIG. 6, whereby any ramp angles can be illustrated. The tool can likewise be used for circular milling or for the so-called waterline milling, respectively, when for example a pocket or a window is to be milled, as shown in FIG. 9.

It has even been shown that the milling tool can also be used for drilling into solid material, thus the spot-drilling. This expansion of the area of application of the milling tool is favored in that the radially inner cutting corners 30 are located on a common pitch circle and in a common radial plane (see ES in FIG. 3C), so that the milling tool does not drift during drilling. This is so, because due to the design of the center cutting edges, the milling tool is able to plunge into a workpiece with the center cutting edges. Due to the hollow grinding, the milling cutter center is sufficiently stable, even if the radially inner cutting corner lies on a diameter, which is only a fraction, for example one-fourth, of the nominal diameter of the milling tool. The hollow grinding can thereby additionally be used for the centering.

A further distinctive feature of the milling tool is to be described on the basis of FIGS. 10 and 10A, in which a cut through a workpiece 50 is illustrated. The processing task is to deburr an edge 52, which is located at a very small distance MA from a bottom surface 54 of a groove.

Due to the fact that in the case of the described milling tool, suggested by means of a dot-dash line in FIG. 10, the radially inner cutting corner is part of the end cutting edge and due to the fact that the center cutting edges are located on a cone jacket surface with a tip angle of above 180°, a type of hollow grinding of the milling cutter tip is created, which makes it possible to also attach chamfer faces to workpiece edges 52 of this type, which are located at the smallest distance MA from a bottom surface 54 of a groove.

Figure 11:
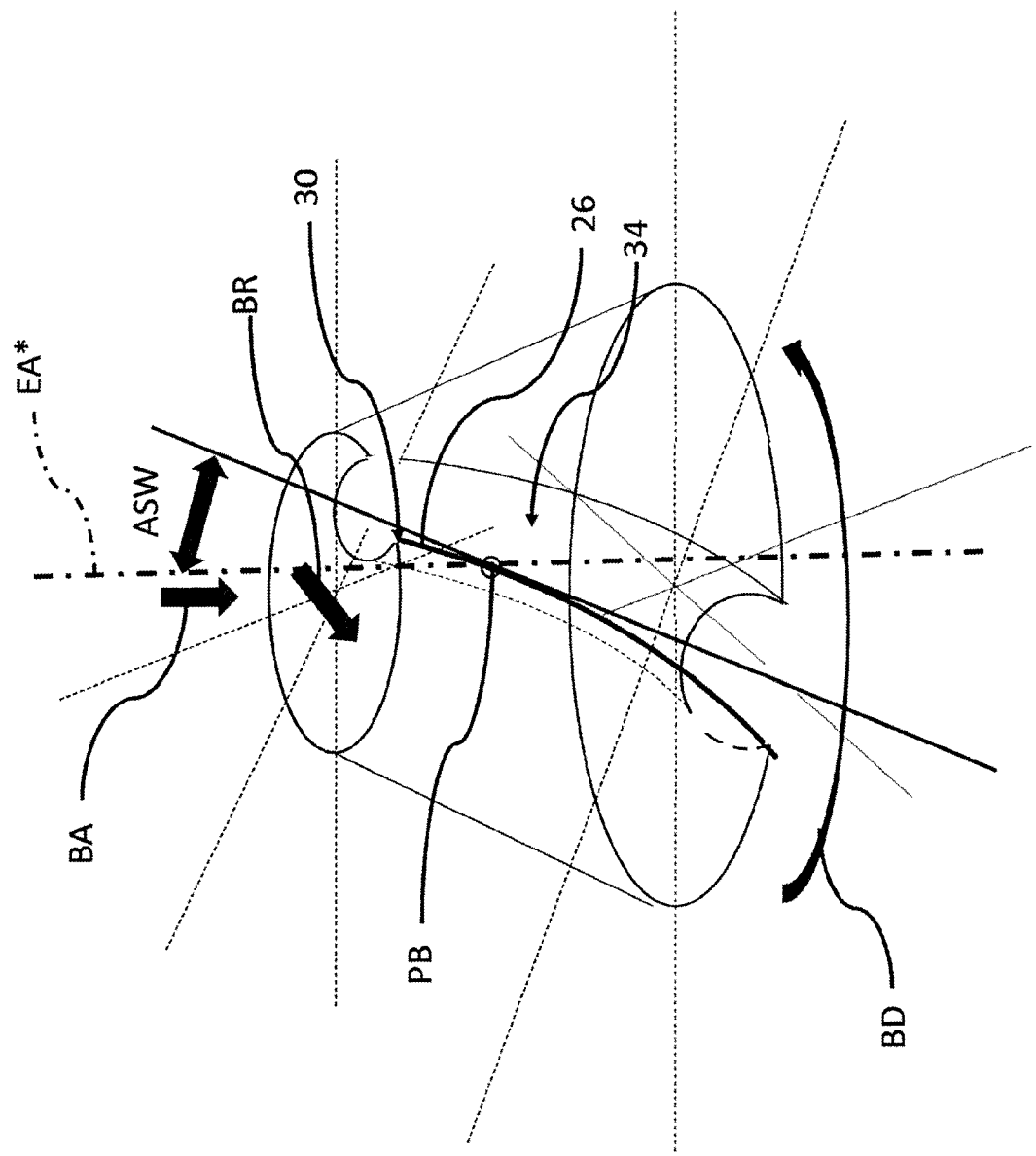
FIG. 11 shows a schematic illustration of a chip groove in a milling tool according to the embodiment according to FIG. 2 to 5 in an enlarged perspective view.

The spiraled course of the end cutting edges 26 can be produced in different ways. The required cutting conditions along the end cutting edges 26 and the amount of the accumulating chips, which are to be removed, are factors thereby. Alternatives for the course of the end cutting edges 26 will be described below on the basis of FIGS. 11 and 12:

When it comes to increasing the chip space as much as possible and to avoid a chip congestion, it is advantageous to form the end cutting edges 26 in such a way that the axial chip angle ASW, as illustrated schematically in FIG. 11, as angle which a tangent T of the end cutting edge 26 draws with an axial plane EA*, which is suggested by means of a dot-dash line in FIG. 8, viewed in said axial plane, is constant over the entire length of the end cutting edge 26. In terms of production, this is achieved, for example, in that the axial movement BA of the grinding disk, which grinds in the chip grooves 34, is adapted in a suitable manner to the rotational movement BD of the tool blank, while a radial relative movement BR is allowed, in order to control or to vary, respectively, the depth TS of the chip groove.

The grinding in of the chip groove 34 can also be used to define the radial chip angle at the radially inner cutting corner 30. This radial chip angle is held, for example, in the range of 5 to 10°, preferably at 6 to 8°.

To improve the smooth running of the milling tool, at least two of the axial chip angles ASW of the individual end cutting edges 26 are different. Particularly preferably, the end cutting edges 26 follow such a course that an even cutting pitch of the end cutting edges 26 is present in a reference plane, which is perpendicular on the milling cutter axis A, so that the following applies:

$$AU=360°/z,$$

wherein AU refers to the circumferential distance of adjacent end cutting edges 26, and z refers to the number of the end cutting edges 26. This reference plane can be located outside of the region of the end cutting edges 26 or also within the region of the end cutting edges 26. With an axial chip angle ASW in the range between 18 and 25°, preferably between 20 and 23°, the milling tool is suitable for all above-described processing tasks, also for drilling into solid material. A tool in this design is shown in FIGS. 2 to 5. For example, the milling tool 20 according to FIG. 3 is equipped with 5 end cutting edges 26, which run in a spiraled manner,
a first one of which has an axial chip angle ASW, thus a constant gradient of 21°, while the following second to fifth end cutting edges 26 have gradients of 22°, 23°, 21.5°, and 20°. The gradients of adjacent end cutting edges 26 thus differ only by maximally 1.5°.

Figure 12:
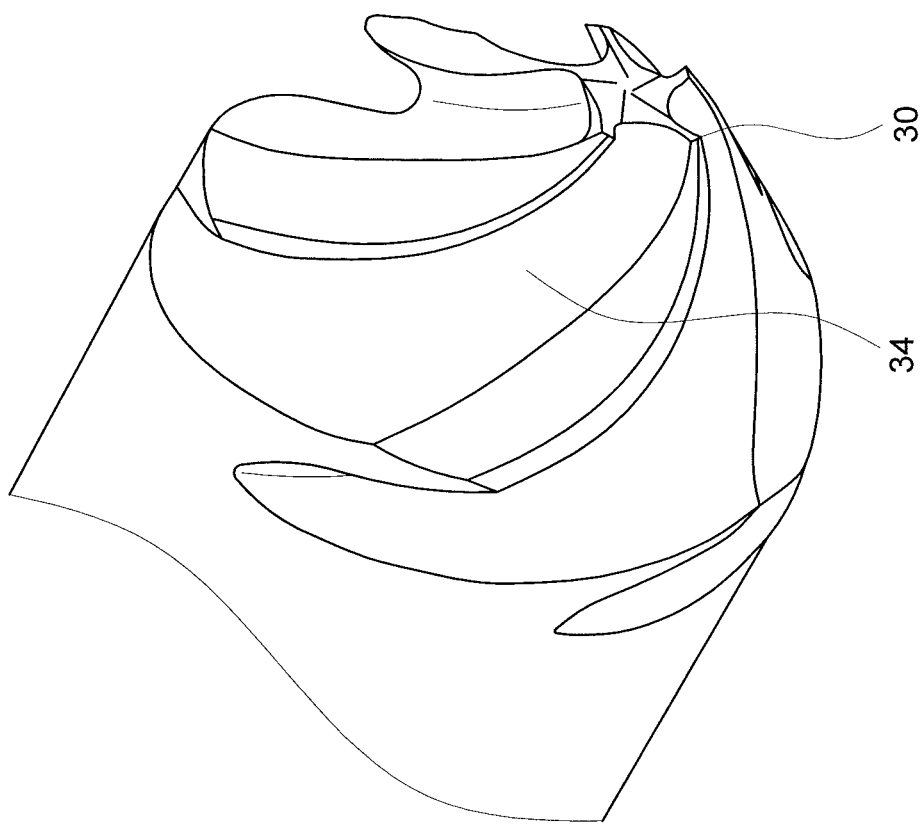
FIG. 12 shows a perspective view of a milling tool according to the first embodiment according to FIG. 1.

An alternative production method is pursued when the end cutting edges 26 are formed in such a way that the axial chip angle ASW, as angle, which the tangent T of the end cutting edge 26 draws at a reference point PB with an axial plane EA* when viewed in the latter, increases linearly, starting at the radially inner cutting corner 30, with the axial distance of the reference point PB from the radially inner cutting corner 30. In this case, the spiral becomes increasingly flatter with increasing distance from the milling cutter tip. In the case of this production method, the ratio of axial feed BA and angular speed of the milling tool blank can be kept constant when grinding in the chip grooves 34. The flattening of the spiral then results in that the rotational speed of the cone jacket, on which the end cutting edges 26 are located, increases linearly with approaching the radially outer cutting corner 28 as a function of the cone angle MFK. A tool of this type is illustrated in FIGS. 1 and 12.

It can be seen that the chip groove 34 in each case starts relatively steeply at the radially inner cutting corner 30, and its course becomes increasingly flatter. Its depth and cross sectional form changes simultaneously. The design in this form is generally achieved in that a profile grinding disk is not only radially moved in response to the axial movement, but is additionally pivoted.

To also achieve an improved smooth running of the milling tool in the case of this production method by means of oscillation suppression, the milling tool is produced in such a way that the end cutting edges 26 are spaced apart differently or unevenly, respectively, in the circumferential direction. The production then becomes simple, the axial chip angles ASW (see FIG. 11) of at least two end cutting edges 26 differ from one another at the radially inner cutting corner 30. In the region of the radially inner cutting corner 30, an even cutting pitch of the cutting edges can be present in this case, and the movement of the grinding disk can run according to the same program when grinding in the chip grooves 34, so as to nonetheless achieve an uneven cutting pitch over the entire length of the end cutting edges 26.

The above-described milling tools have 5 end cutting edges 26. The number of the end cutting edges 26, however, can be varied within wide ranges. In the case of small nominal diameters, it can be 2, and in the case of larger nominal diameters, it can also be more than 5.

The cone angles of the jacket surface MFK, on which the end cutting edges 26 are located, can also differ from the described angle of 90°.

At least in the cutting part, the milling tool preferably consists of a hard material, such as solid carbide (SC), preferably micro-grain carbide with a grain size of below 1.3 µm, preferably below 0.8 µm. The milling tool shown in the figures is made in one piece of a material of this type.

To further improve the service life of the milling tool, the milling tool is usually equipped with a coating, preferably a TiAlN coating, at least in the region of the cutting edges 26 and/or 32.

It goes without saying that modifications of the shown embodiments are possible, without leaving the basic idea of the invention.

For instance, the point thinning 38 for producing the center cutting edges 32 in the milling cutter core can also be produced in such a way that the chip angle of the center cutting edges 32, starting at the radially inner cutting corner 30 all the way to the region BZ (see FIG. 5), remains positive.

The invention thus creates a milling tool for producing chamfer surfaces at workpieces. It has a cylindrical shaft and a cutting part, which has at least two end cutting edges, which are each located on a cone jacket surface and which run in a spiraled convex manner in the direction of rotation, and which each extend from a radially outer cutting corner to an inner cutting corner on the end side. To broaden the area of application of the milling tool to processes, such as the "ramping" or the linear diagonal plunging, respectively, the circular milling, the spot-drilling, or the waterline milling, the end cutting edges merge at the inner cutting corner into center cutting edges, which are located on a cone jacket surface with a tip angle of above 180°, and which run with a defined, preferably positive chip angle, into a region of the milling cutter center located in the milling cutter core.

The invention claimed is:

1. A milling tool for producing chamfer surfaces at workpieces, the milling tool comprising a cylindrical shaft and a cutting part, the cutting part comprising at least two end cutting edges, which define a first cone jacket surface and which are each located on the first cone jacket surface such that each of the at least two end cutting edges are disposed entirely on the first cone jacket surface and each extend along the first cone jacket surface from a respective radially outer cutting corner to a respective radially inner cutting corner, each of the at least two end cutting edges running in a spiraled convex manner in a direction of rotation, each of the end cutting edges merging at the respective radially inner cutting corners with a respective center cutting edge, the center cutting edges are located on a second cone jacket surface, points on the second cone jacket are radially closer to an axis of the milling tool than points on the first cone jacket are, each center cutting edge running from a respective one of the radially inner cutting corners to points that are each closer to the axis of the milling tool than each radially inner cutting corner is, an axis of the first cone jacket surface and an axis of the second cone jacket surface lie on the axis of the milling tool, and the second cone jacket surface extends away from the radially inner cutting corners toward a vertex of the second cone jacket surface in a direction away from a vertex of the first cone jacket surface.

2. The milling tool according to claim 1, wherein in a region of a milling cutter core, the center cutting edges are each formed by a point thinning.

3. The milling tool according to claim 2, wherein each center cutting edge is offset from an axial plane that runs through the tool axis and parallel to the center cutting edge.

4. The milling tool according to claim 1, wherein for each end cutting edge, in a region of the radially inner cutting corner, a chip groove is located between the end cutting edge and a neighboring end cutting edge.

5. The milling tool according to claim 1, wherein for each of the end cutting edges, for each point on the end cutting edge:
    (1) a line that is tangential to the point on the end cutting edge, and
    (2) a plane that includes the axis of the milling tool and the point define a chip angle of a same value.

6. The milling tool according to claim 5, wherein a chip angle value for a first of the end cutting edges differs from a chip angle value for a second of the end cutting edges.

7. The milling tool according to claim 5, wherein the radially outer cutting corners are evenly spaced circumferentially in a first plane, and the first plane is perpendicular to the axis of the milling tool.

8. The milling tool according to claim 7, wherein the first plane lies in the cutting part or in the cutting part.

9. The milling tool according to claim 5, wherein the chip angle for each of the end cutting edges is in a range of between 18 and 25°.

10. The milling tool according to claim 1, wherein for each of the end cutting edges, values of chip angles defined between (1) respective planes that are tangential to respective points along the end cutting edge, and (2) a plane that includes the axis of the milling tool and the point vary linearly, between a respective radially inner cutting corner and a respective radially inner cutting corner.

11. The milling tool according to claim 10, wherein a chip angle value of a radially inner cutting corner of a first end cutting edge differs from a chip angle value at a radially inner cutting corner of a second end cutting edge.

12. The milling tool according to claim 1, wherein the milling tool comprises at least three end cutting edges.

13. The milling tool according to claim 1, wherein a tip angle of the second cone jacket surface is within a range of between 182° and 188°.

14. The milling tool according to claim 1, wherein a clearance angle of the center cutting edges is in a range of between 3° and 20°.

15. The milling tool according to claim 3, wherein a diameter of the center cutting edges is in a range of between 0.01 and 0.03×D, wherein D refers to a nominal diameter of the milling tool.

16. The milling tool according to claim 1, wherein starting at a milling cutter tip, chip grooves located between the end cutting edges have a depth, which increases in an axial direction.

17. The milling tool according to claim 16, wherein in a radial plane, a core diameter at the radially inner cutting corner is in a range of between 0.15 to 0.19×D and at the radially outer cutting corner is in a range of between 0.6 to 0.8×D, wherein D refers to the nominal diameter of the milling tool.

18. The milling tool according to claim 1, wherein the end cutting edges are located on the first cone jacket surface with a cone angle of 90°.

19. The milling tool according to claim 1, wherein the milling tool is formed in one piece of a hard material, with a grain size of below 1.3 μm.

20. The milling tool according to claim 1, wherein the milling tool is equipped with a coating, at least in a region of the cutting edges.

21. The milling tool according to claim 5, wherein the chip angle is positive.

22. The milling tool according to claim 1, wherein the milling tool comprises five end cutting edges.

23. The milling tool according to claim 5, wherein the chip angle is in a range of between 20 and 23°.

24. The milling tool according to claim 1, wherein the tip angle of the cone jacket surface is within a range of between 183 and 185°.

25. The milling tool according to claim 1, wherein a clearance angle of the center cutting edges is in a range of between 4 and 10°.

26. The milling tool according to claim 15, wherein a diameter of the center cutting edges is in a range of between 0.013 and 0.02×D.

27. The milling tool according to claim 19, wherein the one piece of a hard material is solid carbide.

28. The milling tool according to claim 27, wherein the solid carbide is micro-grain carbide.

29. The milling tool according to claim 19, wherein the solid carbide has a grain size of below 0.8 micrometer.

30. The milling tool according to claim 28, wherein the solid carbide has a grain size of below 0.8 micrometer.

31. The milling tool according to claim 20, wherein the coating is a TiAlN coating.

* * * * *

UNITED STATES PATENT AND TRADEMARK OFFICE
CERTIFICATE OF CORRECTION

| | |
|---|---|
| PATENT NO. | : 11,607,737 B2 |
| APPLICATION NO. | : 17/022510 |
| DATED | : March 21, 2023 |
| INVENTOR(S) | : Rolf Ehrler, Martin Dallmann and Jakob Ebel |

It is certified that error appears in the above-identified patent and that said Letters Patent is hereby corrected as shown below:

In the Claims

Column 10 Claim 8, Line 2, change "plane lies in the cutting part or in the cutting part" to "plane lies in the cutting part".

Signed and Sealed this
Twenty-fifth Day of June, 2024

Katherine Kelly Vidal
*Director of the United States Patent and Trademark Office*